United States Patent [19]

Rivere

[11] 3,963,987
[45] June 15, 1976

[54] METHOD AND APPARATUS FOR DIGITAL CALCULATION OF ROTATIONAL SPEED OF AN INTERNAL COMBUSTION ENGINE

[75] Inventor: Jean-Pierre Rivere, Billancourt, France

[73] Assignees: Regie Nationale des Usines Renault; Automobiles Peugeot, both of France

[22] Filed: June 26, 1974

[21] Appl. No.: 483,313

Related U.S. Application Data

[63] Continuation-in-part of Ser. No. 463,503, April 24, 1974, abandoned, which is a continuation of Ser. No. 261,974, June 12, 1972, abandoned.

[30] Foreign Application Priority Data

June 14, 1971  France .............................. 71.21514

[52] U.S. Cl. .............................. 324/166; 324/170
[51] Int. Cl.² .................... G01P 3/48; G01P 3/54
[58] Field of Search ........... 324/161, 163, 166, 173, 324/174, 170

[56] References Cited
UNITED STATES PATENTS
2,556,471   6/1951   Elam .................................. 324/174
FOREIGN PATENTS OR APPLICATIONS
1,953,737   5/1971   Germany .......................... 324/166
4,616,037   7/1967   Japan ................................ 324/173

OTHER PUBLICATIONS
Hammond, P. W. "Zero–Speed Pulse Tachometer", IEEE Trans Industrial Electronics Control Instrum., vol. IECI-17, No. 4, 1970, pp. 292–296.
Walewski, L. G., Kendrick, V. C. "Position Detection Device using Amplitude Modulation", IBM Tech. Disclosure Bulletin, vol. 14, No. 7, Dec. 1971, pp. 2119–2120.

Primary Examiner—John K. Corbin
Assistant Examiner—R. Hille
Attorney, Agent, or Firm—Stevens, Davis, Miller & Mosher

[57] ABSTRACT

A method and apparatus for determining the rotational speed of an engine, using electrical pulses produced with revolving parts of the engine, including the use of a number of series of transducers or pickups producing numbers of asynchronous pulses, different for each series during each revolution of the engine, the transducers corresponding to as many series of detection elements comprising teeth and/or bosses spaced on the periphery of corresponding revolving parts of the engine, such that if $n$ is the number of detection elements of a largest series giving the highest pulse frequency for a corresponding transducer due to engine revolution, and $q$ is the total number of transducers associated with another series of detection elements, then the angular location of said another series of detection elements is obtained to the nearest $360°/qn$. The pulses obtained are shaped, compared with a fixed reference frequency to count the shaped pulses and then divided and converted into analog signals or properly coded signals.

11 Claims, 13 Drawing Figures

TRIGGERING THRESHOLD

METHOD AND APPARATUS FOR DIGITAL CALCULATION OF ROTATIONAL SPEED OF AN INTERNAL COMBUSTION ENGINE

BACKGROUND OF THE INVENTION

This is a continuation-in-part application of U.S. Ser. No. 463,503, filed Apr. 24, 1974 now abandoned which is a continuation of U.S. Ser. No. 261,974, filed June 12, 1972 now abandoned.

The present invention relates to an electronic measuring method for determining the rotational speed on an internal combustion engine and to a device for carrying out this method. It applies particularly to a digital technique that uses simple code conversion or digital-analog conversion for an automatic system for entering data in a calculation system controlling the operating conditions of the engine.

The ignition of the engine is one of the most important factors controlling these operating conditions and the ignition point always must be determined with high accuracy. The same holds true for injection engines with respect to the injection point. These factors require more and more a high degree of accuracy in the measurement of the rotational speed of an engine and correlatively of distributor timing. The known methods using interruptions of electric control of the ignition coil, produced by the opening of the platinum contacts of the ignition contact breaker are not precise. It is not possible to acknowledge the instantaneous speed of the engine during its accelerations because the time interval between two successive openings of the above contacts is too important with regard to the possibilities of acceleration of the engine. The calculation of the speed of the engine amounts to a measure of the above time interval. Furthermore, pulses picked up in such known methods seriously disturb the ignition conditions of the engine. Moreover, these methods are restricted to the controlled ignition engines.

SUMMARY OF THE INVENTION

The present invention accurately measures the rotational speed of an engine with very short delay. The present method comprises generating electric pulses produced from revolving parts of the engine. Asynchronous pulse frequencies are produced by a combination of pickups, the numbers of pulses for each combination being different during each revolution of the engine. These pickups correspond to several series of detection elements which include equally spaced teeth and/or unequally spaced bosses on the periphery of revolving parts of the engine. If $n$ is the number of detection elements of a series giving the highest pulse frequency for a revolution of the engine for a corresponding pickup, and $q$ is the total number of pickups of another series which are spaced by $p + 1/q$ teeth ($p$ being a whole number), the angular location of a boss or detection element corresponding to such other series will be obtained with a precision of $360°/qn$. The pulse frequencies obtained with the pickups of the present method are shaped, then counted by being compared to a fixed reference frequency, and then divided and converted for use, either as analog signals, or directly by proper coding in an automatic control device.

The present invention also includes apparatus which carries out the above method for measuring the instantaneous speed of a vehicle engine. It includes at least one pulse generator controlled by a high frequency oscillatory circuit winding of a pickup cooperating with the teeth of a cogwheel driven by the engine. The apparatus further comprises an assembly converting the output signal the said pickup into a square pulse constituting the envelop of the output, wherein the generator is alternately energized and blocked in synchronism with the passage of the teeth in front of the winding. The assembly comprises a special monostable multivibrator connected to the output of the pickup which maintains the output level of the generator while the period of the pulses applied to the generator has a smaller value than a predetermined time value.

In one embodiment a high reference pulse frequency is compared with the pulse frequency of the pickups, and the number of reference pulses is counted with respect to a given number of pickup pulses. Information as to speed is then obtained in inverse ratio to the speed of the engine. It is also possible to measure the duration of passage of a given number of pulses, according to this reference method, to obtain information in inverse ratio to the engine speed.

In another embodiment a low reference pulse frequency is compared to the pulse frequency produced by the pickups, the number of pickup pulses being measured during fixed times. The information obtained is directly proportional to the speed of the engine.

The accuracy of the measurement depends on the difference between the pickup pulse frequency and the reference frequency. The accuracy of measuring the angular location of a detection element is proportional to the number of pickups of one series and to the maximum number of pulses produced by the pickups in another series during the revolution of the engine.

After counting the pulses, the result is processed by a divider, for example, a dynamic shift register which allows the adequate format of the binary value to be obtained and transferred to a calculation element, that value representing the inverse value of the angular speed of the engine. The output of the divider is processed in a converter for digital-analog conversion for use as calculation datum, or in a code converter for direct application to an automatic control system.

The electronic circuits used for carrying out the present method, such as counters and shift registers, as well as monostable multivibrators and digital-analog converters are available at the present time as integrated circuits permitting the present invention to be carried out inexpensively. The solutions using discrete components should be generally more expensive.

Figure 1A:
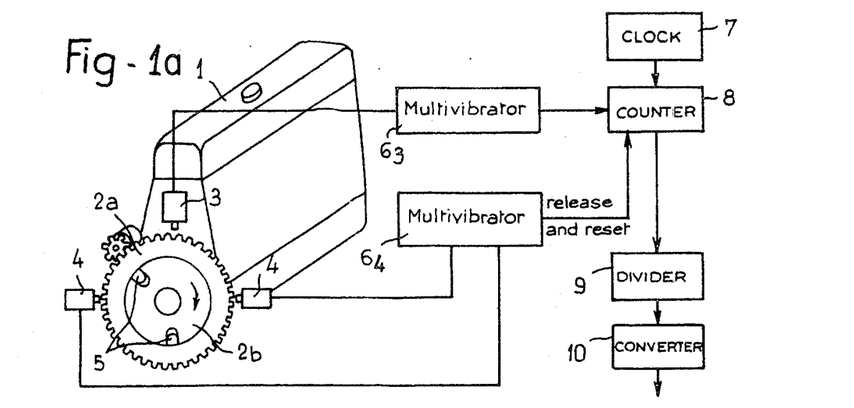
FIG. 1a illustrates a general scheme of the device applied to an internal combustion engine.

FIG. 1a discloses in perspective an engine 1 including a starter having a geared rim 2a. This rim 2a is used advantageously for generating pulses by means of proximate pickups 3 and 4 located near the rim. Pickups 3,4 are preferably of the electromagnetic or electrostatic type.

Pickup 3 is coupled to each of the teeth of the geared rim 2a ensuring the generation of as many pulses as there are teeth during revolution of the engine. Pickups 4 are used for angularly locating a detection element and are activated by bosses 5 fixed on the fly-wheel 2b of engine 1. These bosses 5 are angularly offset with respect to the teeth of the geared rim 2a to avoid all synchronism of pulses produced by the different pickups. The pickups 3,4 may be fixed either on the interior housing of the motor unit or on the clutch housing to permit their adequate location with respect to such teeth of the geared rim 2a and the bosses 5.

A boss 5 detected by the pickup 4 can, for example, represent the maximum of pre-ignition which is needed by the engine. The real pre-ignition is then obtained as a difference between this maximum and the complement to this maximum of the real pre-ignition. The complement is materialized by a multiple whole number of teeth of the geared rim 2 detected by the pickup 3.

The number of pickups 3,4 is not restricted. If $n$ is the number of teeth of the geared rim 2a, the actual angular location from a boss 5 will be defined to the nearest $360°/n$. If two pickups 4 are spaced by $(p + ½)$ teeth, $p$ being a whole number, the angular location which may be obtained from a boss 5 will be defined to the nearest $360°/2n$. In general, if $q$ pickups 4 are spaced by $(p + 1/q)$ teeth, the angular location obtained from a boss 5 will be defined to the nearest $360°/qn$. The advantage of such disposition is apparent when one wants to determine very precisely the ignition point or the optimum quantity of fuel to inject at the most favorable instant.

FIG. 1a also shows a pair of monostable multivibrators $6_3$ and $6_4$ connected, respectively, to pickup 3 and each of the two pickups 4 for pulse shaping. Schmidt's triggers also may be used instead of the monostable multivibrators. The outputs or shaped pulses of each multivibrator $6_3$, $6_4$ are coupled to a counter 8 which also receives high frequency pulses from a clock 7. A divider 9, such as a dynamic shift register, divides the output of counter 8 and the divided signal is fed to a converter 10 for digital-to-analog or code conversion of the engine speed information obtained by this apparatus of FIG. 1a.

As shown in FIG. 1a, a first pulse generated by pickup 4 causes multivibrator $6_4$ to generate a shaped pulse resetting to zero counter 8. A second pulse generated by pickup 4 causes multivibrator $6_4$ to generate a shaped pulse enabling counter 8. As a result, counter 8 commences counting pulses from multivibrator $6_3$ which is enabled by pickup 3 detecting the teeth on geared rim 2a. A third pulse generated by pickup 4 energizes multivibrator $6_4$ to disable counter 8 thereby stopping the counting of pulses provided by pickup 3. This process repeats itself as a fourth pulse generated by pickup 4 causes counter 8 to be reset to zero as mentioned above.

Figure 1B:
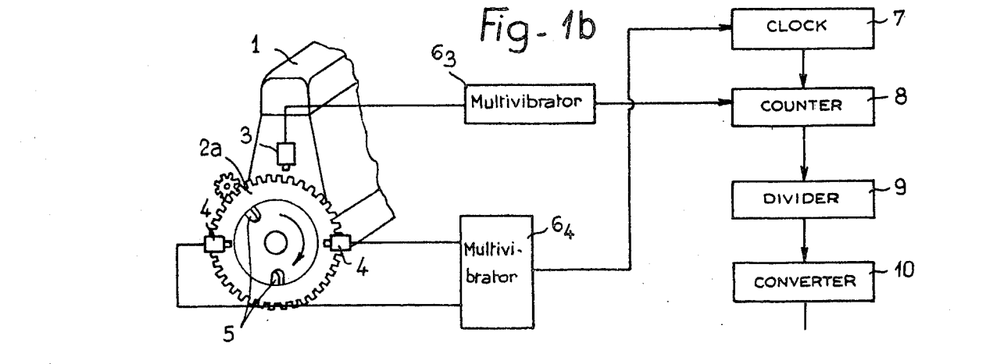
FIG. 1b is a block diagram of the device in which the number of pulses counted correspond to a number of teeth on the geared rim of the engine starter.
Figure 2:
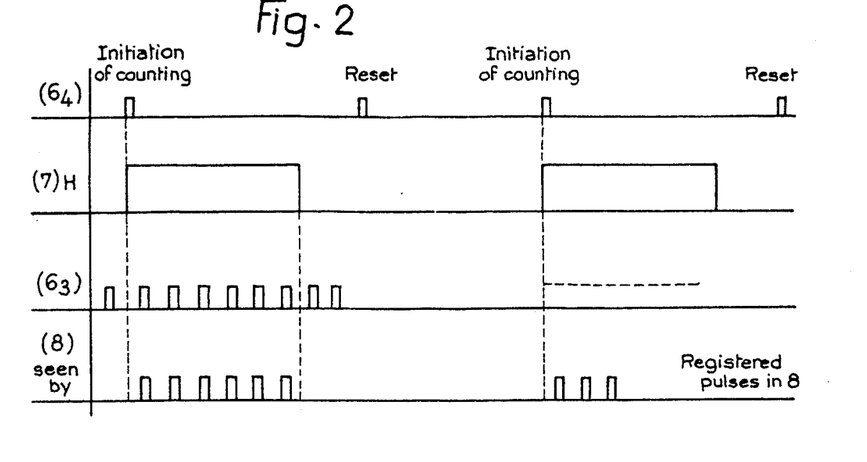
FIG. 2 is a timing diagram of the operation of the device of FIG. 1b corresponding to a low reference frequency.

FIG. 1b is similar to FIG. 1a except that the output of multivibrator $6_4$ is fed to clock 7 rather than counter 8. This FIG. 1b together with the timing diagram of FIG. 2 will be used to describe more specifically one of two ways of determining engine speed, depending on the frequency of clock 7. In FIG. 2, line ($6_4$) shows start (initiation of counting) and reset pulses. Line 7H shows a low frequency counting pulse generated by clock 7. Line $6_3$ shows the shaped pulses from multivibrator $6_3$ and line 8 discloses the pulses from line $6_3$ which are counted by counter 8.

In this one way, the number of teeth of the geared rim 2a passing in front of the pickup 3 is counted during a fixed time. To perform this count, a pickup 4 detects a boss 5 and energizes multivibrator $6_4$. As a result, multivibrator $6_4$ generates a pulse to enable clock 7 for emitting a relatively low frequency pulse of constant width, e.g. 5 ms., as shown in waveform 7H of FIG. 2. Counter 8 is thereby enabled for the duration of such low frequency pulses to count pulses emitted by pickup 3 and shaped by multivibrator $6_3$. There is no determined order for the pickup 4 to detect a boss 5. When a first boss meets a pickup 4 it generates a first pulse; the next boss which meets any pickup 4 generates the second pulse and so on.

If T is the width of pulses generated by clock 7, and $F_1$ the frequency of pulses generated by multivibrator $6_3$, then the number of pulses Q counted by counter 8 is:

$$Q = F_1 \cdot T \pm 1 \text{ pulse}$$

where $F_1 = N \cdot n/60$ and $N$ = the speed of rotation of fly-wheel 2b in t/mn and $n$ = the number of teeth of the geared rim 2a.

Therefore, $$Q = \frac{N \cdot n \cdot T}{60} \pm 1 \text{ pulse}$$

This information Q is proportional to the speed of geared rim 2a.

Figure 1C:
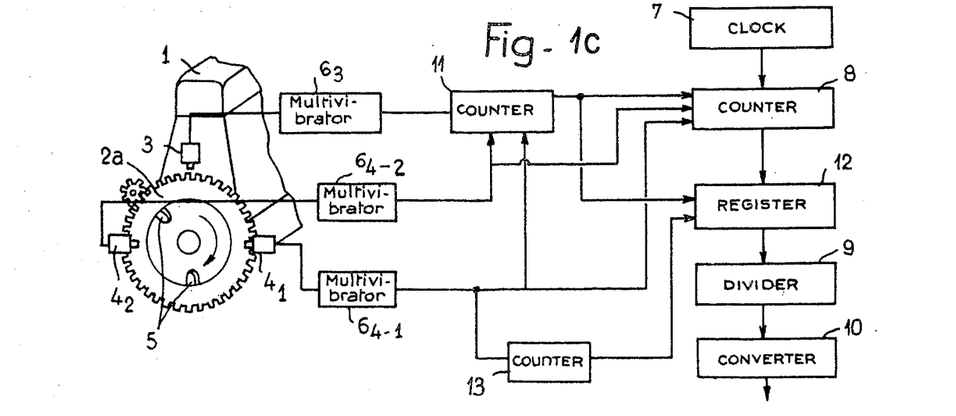
FIG. 1c is a block diagram of the device in which the number of pulses counted is inversely proportional to engine speed.

FIG. 1c discloses apparatus for the other of the two ways of determining engine speed. In this technique the inverse of the engine speed is calculated and may be used specially for determining ignition point advance. In the operation of this method and with reference to the timing diagram of FIG. 3, clock 7 generates a very high frequency $F_2$, i.e., a high frequency in comparison with the passage of the teeth of geared rim 2a across the pickup 3. The high frequency clock pulses are counted in counter 8 during such passage of one or more consecutive teeth.

FIG. 1c shows the engine 1, geared rim 2a, pickup 3 and bosses 5 as in FIG. 1a. In addition, two pickups $4_1$ and $4_2$ are shown similar to pickups 4 of FIG. 1a. Multivibrator $6_3$ is connected at its input to pickup 3 and at its output to a counter 11. Two additional multivibrators $6_{4-1}$ and $6_{4-2}$ have their inputs coupled, respectively, to pickups $4_1$ and $4_2$ and their outputs connected to the input of a counter 11.

The outputs of multivibrators $6_{4-1}$ and $6_{4-2}$ are also connected to the input of counter 8 while the output of counter $6_{4-1}$ is further coupled to the input of counter 13. Counter 8 receives additional inputs from counter 11 and clock 7. A register 12 receives three inputs from, respectively, counter 8, counter 11 and counter 13, and sends its output to divider 9, the output of which is connected to converter 10.

Figure 3:
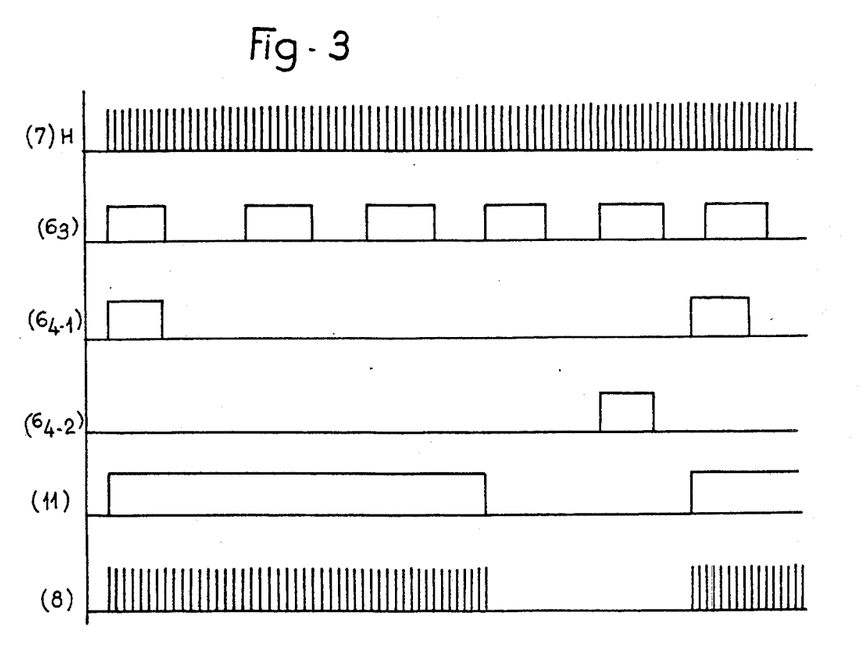
FIG. 3 is a timing diagram of the operation of the device of FIG. 1c, corresponding to a high reference frequency.

In the sequential timing diagram of FIG. 3, the line 7H shows the pulse frequency from clock 7; line $6_3$ shows the shaped pulses obtained from the multivibrator $6_3$; line $6_{4-2}$ discloses the pulses obtained from the pickup $4_2$ and shaped by multivibrator $6_{4-2}$ for enabling counters 11 and 13, and line $6_{4-1}$ the pulses obtained from pickup $4_1$ and shaped by multivibrator $6_{4-1}$ for resetting the counters. The line 11 shows the sequence of counting pulses by the counter 11, one pulse 11 corresponding, e.g., to three pulses $6_3$. The line 8 shows the sequence of counting of pulses by the counter 8.

In the operation of FIG. 1c, when pickup $4_2$ detects a boss 5, a pulse is generated and shaped by multivibrator $6_{4-2}$ to enable counters 8 and 11. As pickup 3 detects the teeth on geared rim 2a, pulses are generated which are shaped by multivibrator $6_3$ and counted by enabled counter 11. When counter 11 counts to capacity, it emits a pulse which stops counter 8 from counting.

Between the time counter 8 is enabled by multivibrator $6_{4-2}$ and stopped by counter 11, it counts pulses from clock 7. The count of counter 8 is then transferred to added register 12 as the latter is enabled by the same output of counter 11 which has stopped counter 8. The pulse then emitted by pickup $4_2$ resets counters 8, 11 so that the counting cycle may be repeated $m$ times, eventually in order to take into consideration irregularities of the fly-wheel rotational speed. Counter 13 is used to reset the register 12 when $m$ additional counts are executed. Resetting occurs when the counter 13 has counted $m$ resetting pulses generated by only one of the pickups 4, which means that $m$ additions have been executed in register. The counter 13 then generates a resetting pulse for register 12. Also, as it is reset, register 12 transfers the added number to divider 9 which divides the register output by $m$. The output of divider 9 is then converted in converter 10 as noted previously.

If $Q_{2i}$ is the number registered by the counter 8 at the $i$-th measure ($1 \leq i \leq m$), $F_2$ is the frequency of the clock 7H, $n$ is the total number of teeth of the geared rim 2a, $e$ is the number of teeth during the passage of which the counter 8 is counting, $T_2$ is the time of passage of $e$ teeth, and $Q_2 = F_2 \cdot T_2$ is the number of pulses of clock 7 during the time $T_2$, and $Q'_2$ is the total number of pulses registered by the register 12, then $$Q_{2i} = F_2 \frac{60}{N} \frac{e}{n}$$

In the case of $m$ consecutive measures $$Q_2 = \frac{1}{m} \sum_{i=1}^{i=m} Q_{2i}$$

If $q$ is the number of pickups $4_1$ and/or $4_2$ and $b$ is the number of bosses 5, then the angular distance separating two pulses issuing from the pickups $4_1$ and/or $4_2$ will be equal to $360°/q \cdot b$. It will be sufficient to take appropriate numbers $q, b$ and $m$ such as to have $q \cdot b/m = K$ integer and at least equal to 1, in order to dispose of $K$ measures of speed for each tour of the fly-wheel.

It may be seen that an advantage of the invention consists in obtaining, quite instantaneously, average values of engine speed, in view of all applications relative to the control of engine speed, e.g. determining the ignition point and control injection.

A device for carrying out the above method comprising a synchronization pulse generator having a stabilized high frequency that produces a pulse train which is modulated to 100% by a cogwheel driven by the shaft of the engine 1. The cogwheel can be, for example, the geared rim 2a of the starter (FIG. 1a). The pulse generator is blocked when one tooth of the cogwheel passes in front of a winding belonging to a pickup 3 which is part of the generator.

Figure 4:
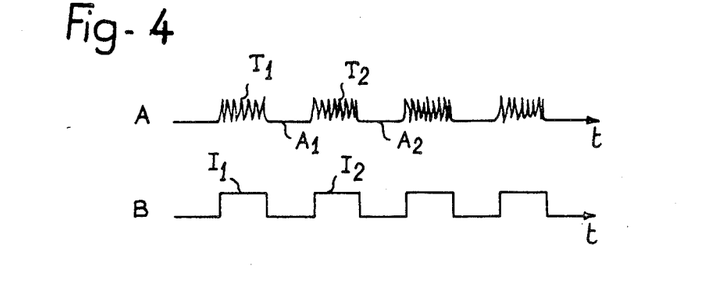
FIG. 4 shows signals generated in the circuits of the invention.

FIG. 4 shows, versus time $t$, a signal A obtained from the generator and comprising pulse trains $T_1$, $T_2$ separated by rectilinear parts $A_1$, $A_2$ . . . The square signal B represents a signal derived from the signal A by an adequate circuit that replaces the trains $T_1$, $T_2$ . . . by single pulses $I_1$, $I_2$ . . . The low levels of the signals A and B correspond preferably to the null potential, i.e., to the ground potential. For instance, the oscillatory circuit of the pickup of the pulse generator may have a frequency of 1 MHz and the geared rim 2a of the starter may have 139 teeth. For a rotational speed of the engine of 6,000 RPM, for example, the number of pulses of the train $T_1$ is about 20 and the period of the train about 75 $\mu$s, corresponding to a frequency of 13,900 Hz.

Figure 5:
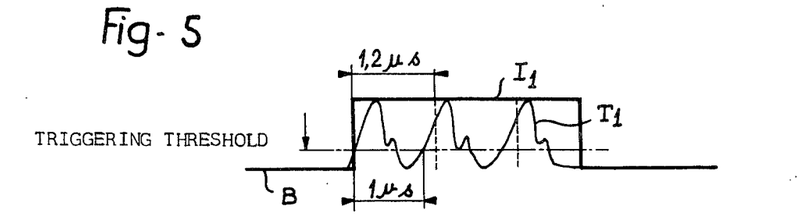
FIG. 5 illustrates in more detail the signals generated in FIG. 4.

FIG. 5 is an enlarged view of the trains $T_1$ and $I_1$ of FIG. 4 superimposed on one another. In order to obtain good accuracy for measuring the rotational speed of the engine 1, it is necessary that the pulse $I_1$ be triggered upon reception of the first generator pulse (from the generator of FIG. 6), that it has sharp leading edges and that the trailing edge occurs as early as the termination of the passage of the last clock pulse.

Figure 6:
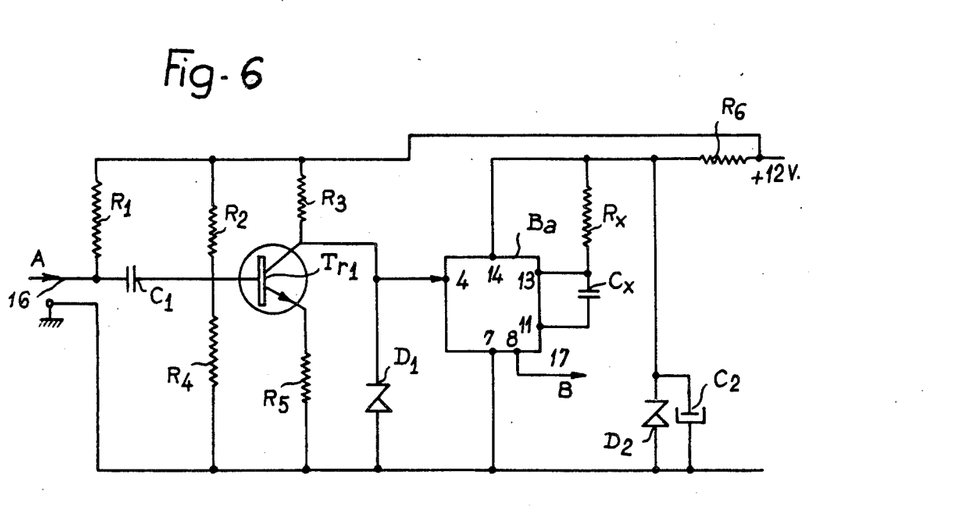
FIG. 6 is a generator according to the invention for producing a square signal shown in FIG. 4.

With reference to FIG. 6 which shows a pulse generator according to the invention for generating the square signal B, in fulfilling these conditions, the signal A generated by a pickup arrives at the line 16. The signal A is amplified by an assembly comprising resistors $R_1$ to $R_5$, capacitor $C_1$ and transistor $TR_1$, and then stabilized to a constant level by means of a Zener diode $D_1$. The signal thus amplified and stabilized is applied to the terminal 14 of a monostable multivibrator $B_a$ having automatic retriggering and corresponding to multivibrators $6_3$ and $6_4$. This monostable multivibrator $B_a$ is functionally retriggered by all signals having a higher amplitude than a predetermined value. Provided that such signals occur consecutively and take place at time intervals narrower than a threshold interval, the output level of this monostable multivibrator is constant. An example of such a multivibrator is the monostable multivibrator T 118 sold by the American company of S.G.S. FAIRCHILD. As an example, this threshold may be about 1.1 $\mu$s, corresponding to that shown in FIG. 5.

The signal B is thus obtained at the output 8 of the multivibrator $B_a$ on the line 17. This circuit of FIG. 6 is supplied by the battery of the vehicle, which has, for example, a rated voltage of 12 volts. The positive pole of the battery is connected through a resistor $R_6$ to the terminal 14 of the monostable multivibrator, the terminal 7 of which is connected to ground. The power supply is stabilized by means of a Zener diode $D_2$ connected in parallel with a capacitor $C_2$.

Figure 7:
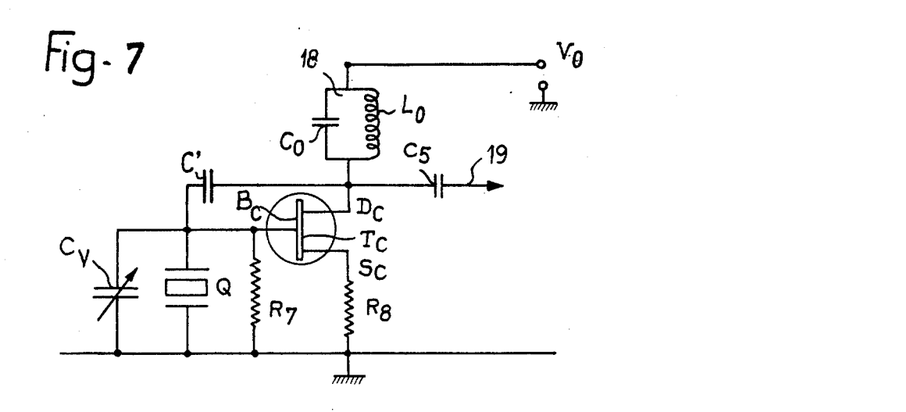
FIG. 7 discloses a high frequency pulse generator according to the invention.

FIG. 7 shows a quartz oscillator producing the clock pulses of clock 7 according to the invention. The oscillator comprises a quartz crystal Q, a field effect transistor $T_c$, an oscillatory circuit 18 of an LC type including an inductance Lo and a capacitor Co, an adjustment capacitor Cv, resistors $R_7$, $R_8$ and a filter capacitor $C_5$. The output of this circuit is obtained on the line 19 and the supply voltage is obtained from the vehicle battery. The quartz Q is connected across the base Bc of the transistor $T_c$ and the source Sc is connected to ground, while the oscillatory circuit 18, completed by a feedback capacitor C', is connected to the drain $D_c$ of transistor $T_c$. For example, with a quartz of 1 MHz, for $Co = 470\ pF$, $Lo = 90\ \mu H$, $Vo = 5$ volts, a sinusoidal signal at a frequency of 1 MHz is obtained, the peak to peak amplitude of which is 5 volts. The capacitor Cv permits a modification of this frequency of $\pm 50$ Hz. Such oscillator has the advantage of having a frequency which varies very little with temperature.

Figure 8:
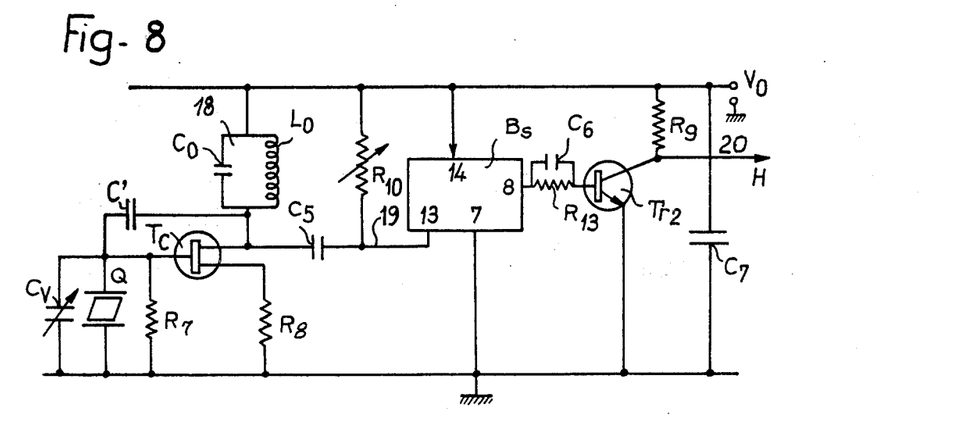
FIG. 8 shows an assembly according to the invention for producing high frequency clock signals.

FIG. 8 further shows the clock which is an assembly derived from the assembly of FIG. 7 and this circuit produces a pulse train at the same frequency, but with square and positive signals, the low level being ground potential. It comprises, in addition to the elements of the assembly of FIG. 7, a Schmidt's trigger Bs, fixed resistors $R_9$, $R_{13}$, a variable resistor $R_{10}$, capacitors $C_6$ and $C_7$, and an amplifying transistor $Tr_2$. The output signal H is applied to the line 20. The trigger Bs receives on its input terminal 13, the signal from the field effect transistor Tc and provides an output signal on its terminal 8. The two terminals 14 and 7 are connected respectively to the positive supply potential Vo and to ground. The output voltage on the line 20 varies from 0 to $+$ Vo volts.

Figure 9:
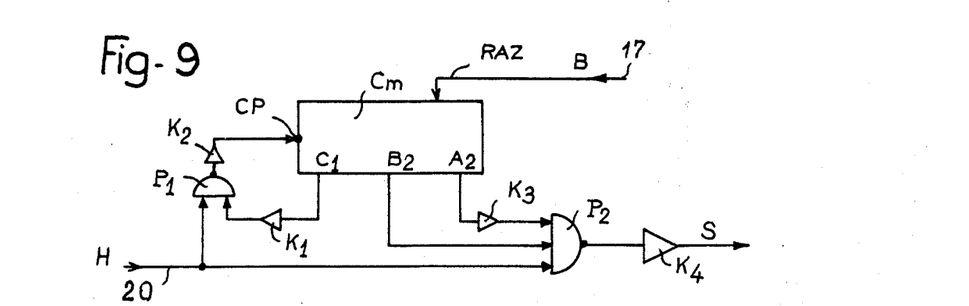
FIG. 9 discloses an assembly according to the invention for producing a pulsed signal derived from the output signals of the generator of FIG. 6 and of the assembly of FIG. 8, the frequency of which permits the determination of the speed of the engine.

FIG. 9 discloses a circuit for producing a pulsed signal S, comprising a square pulse synchronous with a generator pulse, after each trailing edge of the signal B of FIG. 4 is delivered by the generator assembly of FIG. 6. This assembly is a combination of the assembly of FIG. 8 and of an assembly controlled by the clock and described thereafter. The pulsed signal H applied on the line 20 is coupled to a counter Cm of a known type, which produces three output signals $A_2$, $B_2$, $C_1$ on three separate outputs and which comprises a counting input C.P. and a resetting to zero input RAZ. The signal B from the output line 17 of FIG. 6 is applied to the input RAZ. This assembly comprises further two NAND circuits $P_1$ and $P_2$ and four inverters $K_1$, $K_2$, $K_3$, $K_4$. The clock signal H is applied to the counting input CP through the circuits $P_1$ and $K_2$. The circuit $P_1$ receives the signal H on its first input and the signal $C_1$ inverted by $K_1$ on its second input. The signals $A_2$ inverted by $K_3$, $B_2$ and H are applied to the circuit $P_2$, the output of which is connected to the input of the inverter $K_4$ which produces on its output the desired signal S.

Figure 10:
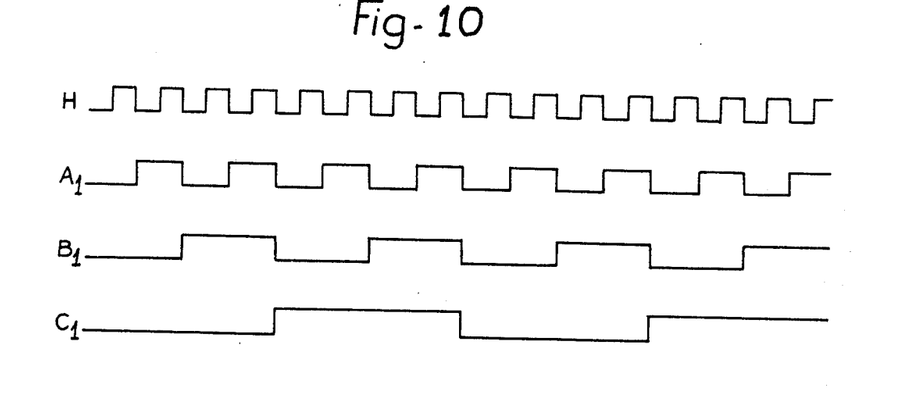
FIGS. 10 and 11 show timing diagrams of signals to aid in a better understanding of the operation of the assembly of FIG. 9.
Figure 11:
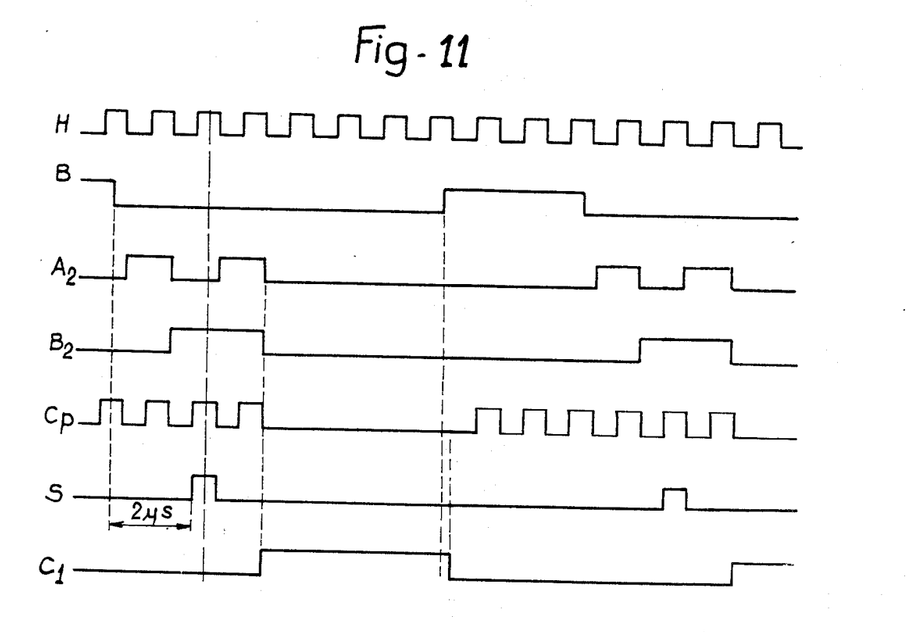

The operation of this assembly will be better understood with reference to FIGS. 10 and 11. The clock signal is represented at H (FIG. 10). The counter Cm comprises three stages of division by two, owing to a conventional assembly (not shown) and produces internally the signals $A_1$, $B_1$ and $C_1$ of FIG. 10, the frequencies of which are respectively one half, one quarter and one eighth of the repetition frequency of the signal H. The signal applied to the input CP is equal, in boolean logic, to:

$$C_p = \overline{C_1} \cdot H$$

The signals $A_2$ and $B_2$ and signals synchronous with the signals $A_1$ and $B_1$, but conditioned by the signals B and $C_1$, which have as logical values:

$$A_2 = A_1 \cdot \overline{B} \cdot \overline{C_1}$$

and $$B_2 = B_1 \cdot \overline{B} \cdot \overline{C_1}$$

In other words, the counter Cm counts one of two pulses Cp, but it is moreover conditioned by the signal B.

The output signal S is $$S = H \cdot \overline{A_2} \cdot B_2$$

This signal S, shown in FIG. 11, complies well with the above mentioned definition, because it occurs only once before the high level or level 1 of the signal $C_1$.

This signal S permits measurement of the instantaneous speed of the engine by counting, for example, the number of pulses of this signal produced in a given time or in determining the instantaneous frequency of these pulses.

Practically, the inverter $K_4$ may be a transistor operating between two voltage levels; for example, 0 volts (i.e. ground potential) and 5 volts.

What is claimed is:

1. A digital method for calculating the speed of an internal combustion engine, using electric pulses produced with revolving parts of the engine, the revolving parts each having a series of detection elements, comprising the steps of producing a number of asynchronous pulses using a plurality of pickups, one of said pickups associated with a series of said detection elements, one of said pickups corresponding to a first series of detection elements having teeth all equally spaced on the periphery of one revolving part and two of said pickups corresponding to a second series of unequally spaced detection elements on the periphery of another revolving part, said asynchronous pulses being different for each revolution of the engine for said one pickup and said two pickups, respectively, wherein said first series has more detection elements than said second series and if $n$ is the number of detection elements of said first series giving the higher pulse frequency for a corresponding pickup due to engine revolution, and $q$ is the total number of pickups associated with the second series, then angular location of said second series of detection elements is obtained to the nearest $360°/qn$, shaping the asynchronous pulses, comparing said shaped pulses to a fixed clock reference frequency to count said shaped pulses, dividing the counted pulses and then converting the divided pulses into signal information for use in an automatic engine control device.

2. A digital method according to claim 1, in which the higher pulse frequency is obtained by using the teeth of a geared rim of a starter of the engine as the first series of detection elements.

3. A digital method according to claim 2, including producing angular location pulses by said second series of detection elements, said second series including detection bosses disposed on the rim of a flywheel of the engine, said bosses being angularly offset with respect to the teeth of the geared rim of said starter.

4. A digital method according to claim 1, in which the fixed reference frequency is obtained by means of a high frequency clock, the pulse number of which is high compared with a given pulse number produced by said pickups.

5. A digital method according to claim 4 in which the duration of passage of a given pulse is measured with respect to the reference frequency.

6. A digital method according to claim 1, in which the fixed reference frequency is low compared to the pulse frequency produced by said pickups, and the pulse number is measured during fixed times, dependent on the reference frequency.

7. A device for measuring the rotational speed of an internal combustion engine of a vehicle, comprising:
   a. a first revolving means having a first series of detection elements and driven by the engine, said first revolving means including a cogwheel and said first series including teeth equally spaced on the periphery of said cogwheel;
   b. a second revolving means having a second series of detection elements and driven by the engine, said second series including unequally spaced detection elements on the periphery of said second revolving means;
   c. pulse generator means for producing asynchronous pulses including a plurality of pickups, each one of said pickups being coupled with a series of said detection elements, one of said pickups being coupled to said first series of detection elements, and the other said pickups being coupled to said second series of detection elements, said asynchronous pulses being different for each revolution of the engine for said one pickup and said other pickups, respectively, wherein said first series has more detection elements than said second series and if $n$ is the number of detection elements of said first series giving a high pulse frequency for said one pickup due to the engine revolution, and $q$ is the total number of said other pickups coupled to said second series, then angular location of said second series of detection elements is obtained to the nearest $360°/qn$, and wherein said one pickup includes a high frequency oscillatory circuit including a winding, said first series of detection elements being coupled to said winding so that said one pickup of said pulse generator means is alternately energized and blocked in synchronism with the passage of said teeth in front of said winding;
   d. means for shaping said asynchronous pulses;
   e. a clock means for generating pulses of a fixed reference frequency;
   f. means comparing said shaped asynchronous pulses to said pulses of a fixed reference frequency for counting said shaped asynchronous pulses;
   g. means for dividing said counted pulses from said counting means; and
   h. means for converting said divided pulses from said dividing means into signal information for use in an automatic control device for the engine.

8. A measuring device according to claim 7 wherein said clock means comprises a field effect transistor producing output signals, the source of which is connected to the ground of the vehicle through a resistor, a quartz crystal connected across the base of said transistor and ground, an oscillatory circuit connected across a direct potential supplied by a battery of the vehicle and the drain of said transistor, a trigger receiving the field effect transistor output signals and producing square pulse signals, and an amplifier for amplifying said square pulse signals.

9. A measuring device according to claim 7 wherein said means for shaping comprises means for converting said asynchronous pulses into square pulses constituting the envelopes of said asynchronous pulses, wherein said converting means includes a monostable multivibrator which is connected to said pulse generator means and maintains its output level while the period of the asynchronous pulses applied to said shaping means is shorter than a predetermined time period.

10. A measuring device according to claim 9 wherein said counting means comprises a pulse counter including two stages of division by two and having a counting input and a resetting to zero input to which are applied said square pulses, two output signals of said counter conditioned by said square pulses being applied to a first NAND gate simultaneously with a pulse signal from said clock means, said first NAND gate producing at its output a measuring signal.

11. A measuring device according to claim 10, wherein the counting input is connected to the output of a second NAND gate, the input signals of which are respectively the pulse signal from said clock means and an inverted third output signal of said counter.

* * * * *